United States Patent [19]

Fohl

[11] 4,135,227

[45] Jan. 16, 1979

[54] LEADLESS ELECTRIC FLASH LAMP ASSEMBLY

[75] Inventor: Timothy Fohl, Carlisle, Mass.

[73] Assignee: GTE Sylvania Incorporated, Danvers, Mass.

[21] Appl. No.: 873,378

[22] Filed: Jan. 30, 1978

[51] Int. Cl.² ............................................. G03B 15/02
[52] U.S. Cl. ......................................... 362/6; 362/13; 362/232; 362/247; 362/250; 362/347
[58] Field of Search ..................... 362/6, 13, 232, 250, 362/247, 347

[56] References Cited

U.S. PATENT DOCUMENTS 3,315,071  4/1967  Pfefferle .................................. 362/11

*Primary Examiner*—Stephen J. Lechert, Jr.
*Attorney, Agent, or Firm*—Lawrence R. Fraley

[57] ABSTRACT

A flash lamp assembly for use with a camera and the power source associated therewith. The assembly includes several leadless, capacitively-ignited flash lamps retained within a longitudinal, light-transmitting housing and activated by the passage of electrical energy through the housing either in the form of a capacitive discharge or by direct connection to a pair of resilient contacts. Spaced conductive means located about each flash lamp receive the energy and capacitively ignite the lamp. Means for electrically connecting each lamp to the above power source are also described and include a mechanism for sequentially advancing the assembly's housing therein.

16 Claims, 7 Drawing Figures

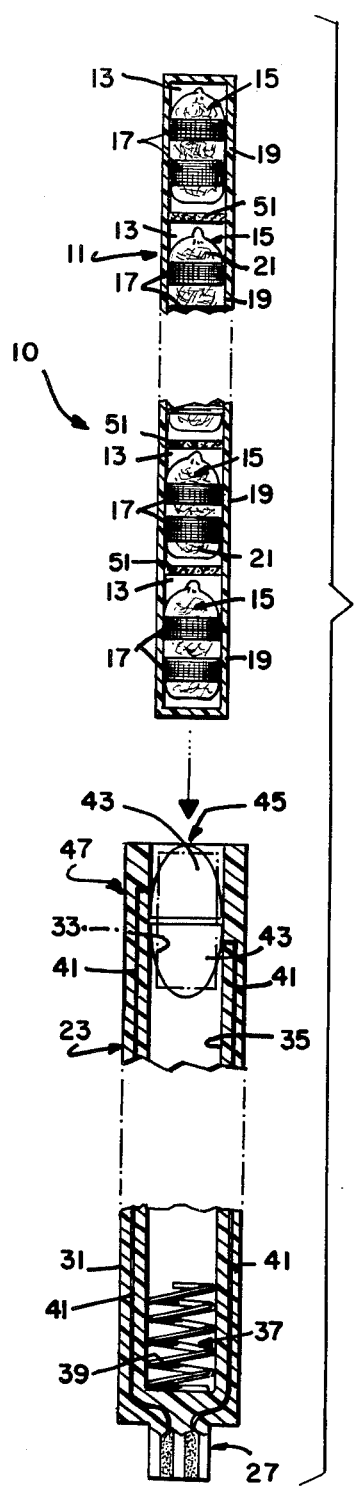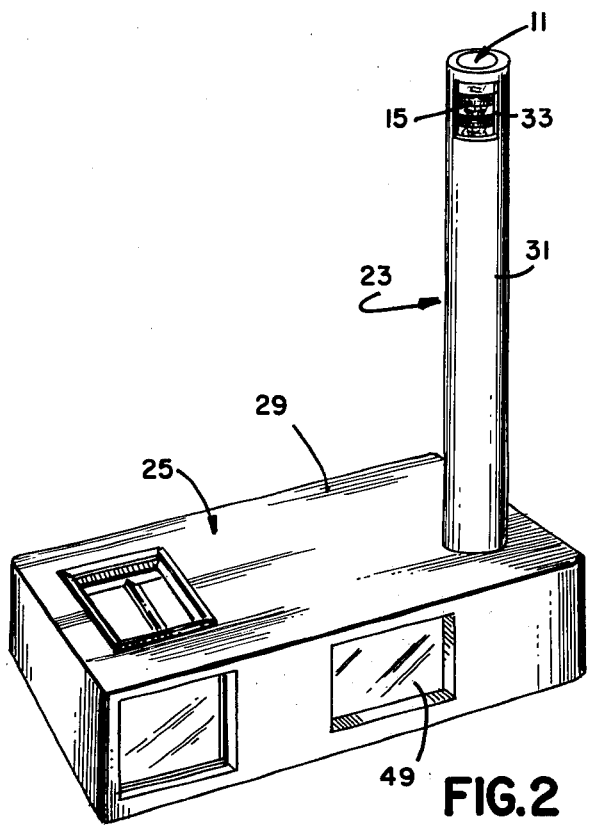
FIG. 1
FIG. 2

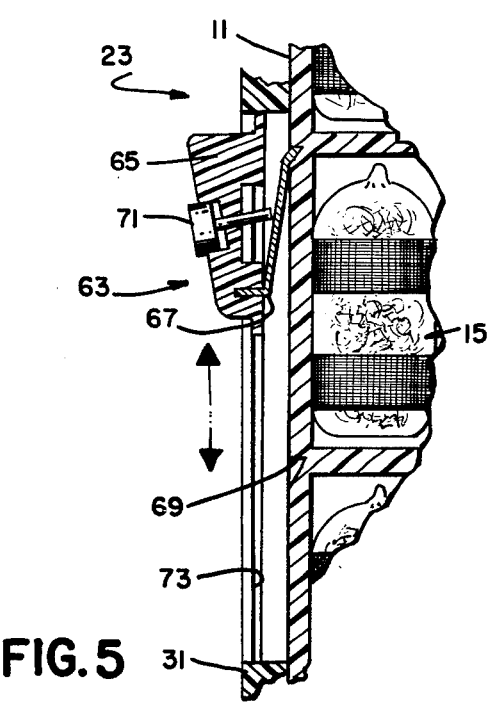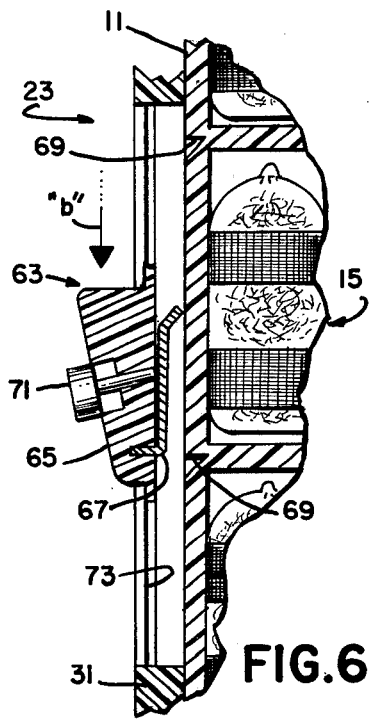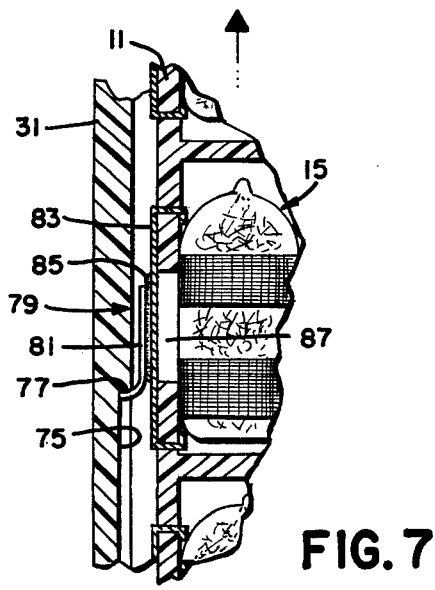

LEADLESS ELECTRIC FLASH LAMP ASSEMBLY

REFERENCE TO CO-PENDING APPLICATIONS

An application entitled "Leadless Electric Flash Lamp" (Inventor: T. Fohl) was filed Jan. 30, 1978 and is listed in the Patent and Trademark Office under Ser. Nos. 873,258. 873,258 is assigned to the same assignee as the instant application and defines a leadless electric flash lamp suitable for use with the present invention.

An application entitled "Single Lead Electrically-Activated Flash Lamp" (Inventors: P. B. Newell et al) was also filed Jan. 30, 1978 and assigned to the assignee of the present invention. This application is listed under Ser. No. 873,250 and defines a single lead flash lamp which has an external conductive layer capacitively coupled to the lamp's filamentary material.

Still another application was filed Jan. 30, 1978 and is listed under Ser. No. 873,376. Ser. No. 873,376, entitled "Means For Electrically Contacting Flash Lamp Having External Conductive Coating" (Inventors: P. B. Newell et al), defines several means for electrically contacting the conductive coatings located on the flash lamps described in the above applications Ser. No. 873,250 and Ser. No. 873,258.

BACKGROUND OF THE INVENTION

The present invention relates to multiple flash lamp assemblies and particularly to such assemblies which are mountable on a camera and capable of being electrically activated by the camera's power source.

Electrically-activated multiple flash lamp assemblies for use in photographic applications are well known in the art and include the examples described in U.S. Pat. Nos. 3,327,105 (F. D. Kottler et al), 3,598,984 (Slomski), 3,969,066 (Smialek). As defined, these assemblies are mountable on a corresponding camera and receive the required energizing electrical current from the camera's power source. In many recent camera designs, this power source is a piezoelectric crystal which, when mechanically actuated, supplies the multilamp array with a pulse sufficient to trigger one of the flash lamps therein. It will be understood from the following description that the present invention is preferably utilized with cameras which employ the aforedescribed piezoelectric source.

The instant invention represents a unique concept in multiple flash lamp designs by providing an assembly which utilizes several flash lamps which rely on capacitive discharge through the lamp's envelope to achieve ignition. This capacitive discharge in turn is the result of the lamp having received electrical current (or pulse) from a suitable power source (e.g. piezoelectric crystal) typically associated with many of today's cameras. The lamps as such are leadless and thus assure that the assembly will possess the highly desirable features of compactness, low cost, and ease of assembly and operation. As will be described, the present invention substantially overcomes the undesirable effect called "red-eye". "Red-eye" occurs during photographic exercises when a fraction of light which reaches a subject's eye is directed back in the direction of its origin. Because a high percentage of this light is at the red end of the radiant energy (electromagnetic) spectrum and further because the camera's lens is located immediately adjacent the light source, the lens records the subject's eye as appearing red. The present invention substantially eliminates this occurrence by adequately spacing the flashing lamp from the camera's lens.

It is believed, therefore, that a multiple flash lamp assembly possessing the above several advantageous features would constitute a significant advancement in the art.

OBJECTS AND SUMMARY OF THE INVENTION

It is a primary object of the invention to enhance the multiple flash lamp assembly art by providing an assembly possessing the features described above.

In accordance with one aspect of the invention, a flash lamp assembly is provided which comprises a longitudinal, light-transmitting housing defining several juxtapositioned chambers therein. Within each chamber is a flash lamp which uses capacitive discharge to achieve ignition thereof, said discharge occurring upon receipt of electrical energy through the assembly's housing. A pair of spaced conductive means are located about the lamp's envelope for receiving the electrical energy and initiating the capacitive activation of the lamp.

BRIEF DESCRIPTION OF THE DRAWINGS

FIG. 1 is an exploded front elevational view, in section, of a flash lamp assembly in accordance with a preferred embodiment of the invention;

FIG. 2 is an isometric view of a camera with the assembly of FIG. 1 thereon;

FIGS. 5 and 6 are elevational views, in section, illustrating a preferred embodiment of sequencing means of of the invention; and FIG. 7 is an elevational view, in section, of another form of sequencing means of the invention.

DESCRIPTION OF THE PREFERRED EMBODIMENTS

Figure 3:
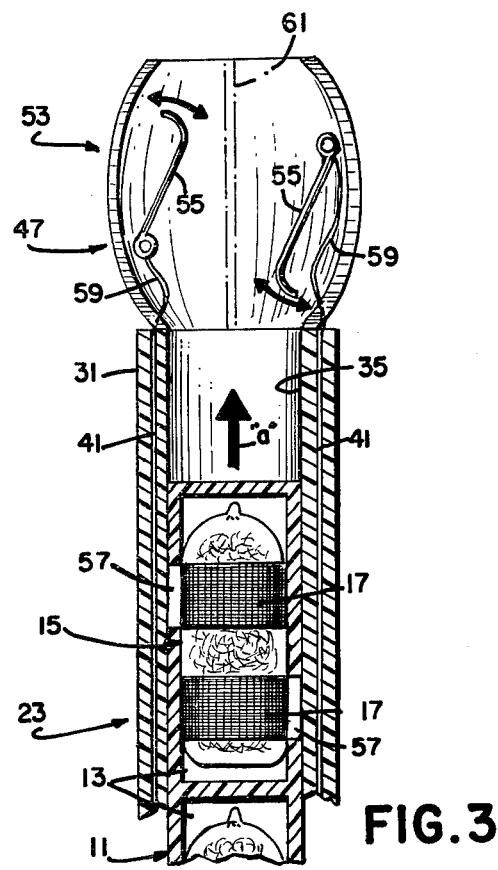
FIG. 3 is a front elevational view, in section, of one embodiment of a reflector for use with the invention.

For a better understanding of the present invention together with other and further objects, advantages and capabilities thereof, reference is made of the following disclosure and appended claims in connection with the above-described drawings.

With particular reference to FIG. 1, there is shown a flash lamp assembly 10 in accordance with one embodiment of the invention. Assembly 10 comprises a longitudinal, light-transmitting housing 11 which is preferably of plastic or similar electrically insulative material. Housing 11 defines a plurality (e.g. eight) of chambers 13 therein which are aligned in a linear manner. Housing 11 is preferably cylindrical and includes several electrically-activated flash lamps 15 with each lamp located within a respective chamber 13. Lamps 15 are preferably coaxially aligned with the axis of the cylindrical housing. The preferred lamps for use with the invention are those defined in the aforementioned co-pending application under Ser. No. 873,258. As defined therein, each lamp 15 includes first and second electrically conductive means 17 (e.g. thin transparent tin oxide coatings) about the lamp's glass envelope 19. Spacedly located on the inside of each envelope is a pair of conducting coatings (not shown), also of tin oxide, each of which is capacitively coupled to one of the conductive coatings 17 through the envelope's walls. A quantity of combustible, filamentary material 21 (e.g.

shredded zirconium or hafnium) within the lamp is electrically joined to the inner coatings. A quantity of primer material (not shown) is in turn connected to the filamentary material such that when a suitable amount of electrical current is supplied outer coatings 17, each coating capacitively discharges to the inner coatings to in turn ignite the primer. The result is a highly intense flash sufficient to illuminate a subject being photographed.

Flash lamps 15 are ignited in the manner described through the walls of light-transmitting housing 11. As will be described, this may occur as a result of capacitive discharge through housing 11 or by direct electrical contact through openings therein. In the embodiment of FIG. 1, assembly 10 includes means 23 for providing the above electrical connection to each of the flash lamps 15 within housing 11. Means 25 is adapted for being mounted on a camera 25 (FIG. 2) via a suitable mounting stud 27 which fits within a corresponding socket within the camera. Accordingly, means 23 provides the electrical interconnection between each of the lamps 15 and the source of electrical potential (not shown) usually located within the camera's body 29. Means 23 includes an elongated, insulative casing 31 having a rectangular aperture 33 at one end thereof (shown in phantom in FIG. 1). Casing 31 is also preferably cylindrical in shape and defines a passage 35 therein. Housing 11 slidably moves within passage 35 to permit alignment of each lamp 15 with aperture 33 at the desired time of ignition. In the embodiment of FIG. 1, this ignition is accomplished capacitively. This is achieved when the camera operator inserts housing 11 downwardly into casing 31 until engagement is made with a biasing means 37. Means 37, preferably a helical spring 39, is positioned at the bottom of passage 35 and biases housing 11 upwardly (toward aperture 33). In the simplest form, the operator can use his thumb or finger atop the casing 31 to limit movement of housing 11. After firing the respective lamp 15, the operator can release the housing and permit it to protrude above the end of casing 31. Housing 11 could be provided with notches (similar to those shown in FIGS. 5 and 6) to permit the operator to "break off" the expired flash lamp after each ignition thereof whereupon a new end surface would be presented. Again, the operator can manually retain the housing 11 (and a flash lamp) in the required position. The embodiments of FIGS. 3–7 represent alternative (and more preferred) methods of assuring precise alignment of the lamps 15 prior to ignition thereof.

As stated, the embodiment of FIG. 1 utilizes capacitive discharge to achieve ignition of flash lamps 15. A pair of conductors 41 are positioned within casing 31 and electrically joined to a respective part 43 of a two-part reflector 45. Parts 43 are insulated from each other (by proper spacing) as are conductors 41. As shown, each conductor 41 exits casing 31 at mounting tab 27. A circuit path (e.g. printed circuit) is provided on tab 21 to facilitate connection with the camera socket. Each part 43 of reflector 45 is partially spherical in configuration to enhance forward emission of the intense light. The reflector is preferably plastic (styrene), and has a thickness of about 0.02 inches. A thin aluminum coating is provided thereon. As an alternative embodiment, an internal reflector may be provided in housing 11 adjacent each lamp 15. The ends of conductors 41 which are shown being connected to parts 43 of the reflector 45 could thus spacedly encircle the passage 35 near aperture 33. Flow of current therein would cause a capacitive discharge through housing 11 to a respective coating 17 to initiate lamp ignition.

In the manner described above, casing 31 thus defines a fixed station 47 at which each lamp 15 is sequentially fired as housing 11 moves upwardly within passage 35. Station 47 is therefore oriented within casing 11 relative to the passage and may be located at a position other than on the casing's end. It is preferred to locate the firing station as shown, however, to substantially eliminate the possibility of the aforementioned adverse condition called "red-eye". Means 23 thus also serves as a spacing element to properly locate station 47 from the camera's lens 49 (shown in FIG. 2).

Within each chamber 13 of housing 11 is located an opaque shielding member 54 for preventing sympathetic ignition between flash lamps in adjacent chambers. Sympathetic ignition occurs when the radiant energy emitted by one lamp causes a nearby lamp to also ignite. Members 51 may comprise an opaque coating on the walls between the chambers, or these members may comprise separate inserts which fits within respective openings provided within the walls.

Figure 4:
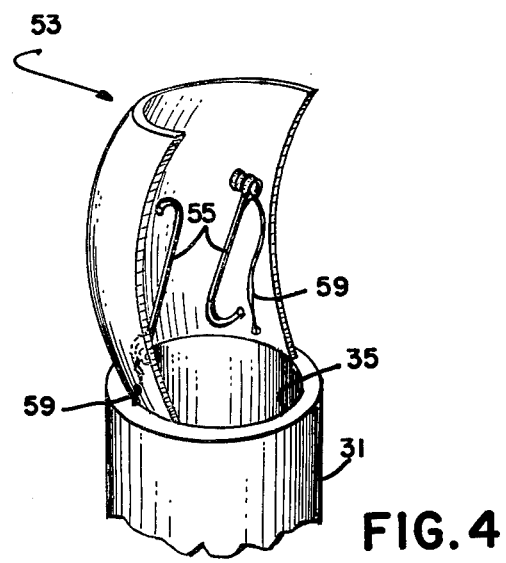
FIG. 4 is an isometric view of the reflector of FIG. 3.

The embodiment of FIGS. 3 and 4 represents a preferred method for directly contacting the external coatings 17 and lamps 15 as housing 11 is passed upwardly (direction "a") within passage 35. A fixed reflector 53 is mounted on casing 31 at station 47 and includes a pair of resilient, spring-loaded contacts 55 which pass through a pair of respective openings 57 within housing 11 adjacent each chamber 13. Each contact 55 is joined electrically (via wiring 59) to the conductors 41 within casing 31 and engages a respective coating 17 as each lamp 15 becomes sequentially positioned at station 47. Reflector 53 is comprised of styrene to thus assure electrical insulation for each contact 55. To enhance forward output, the internal surface of the reflector is provided with a thin coating of insulative reflective material. Should it be desirable to utilize a metallic reflector 53 or one with a metallic reflective coating thereon, a spacing 61 (shown in phantom in FIG. 3) would be provided to assure separation of contacts 55. After firing, contacts 55 swing out from housing 11 to permit upward movement of housing 11. If flash lamps 15 include an external protective coating, e.g. cellulose acetate, portions of this coating would be removed such that contact could be made to the conductive coatings 17 by the contacts 55.

In FIGS. 5 and 6, means 23 is shown as comprising a means 63 for sequentially advancing housing 11 within casing 31. Means 63 includes a manually-operable slide member 65 which in turn includes a pawl 67 for engaging housing 11 at a respective notch or channel 69 formed within the housing. An operator places his thumb or finger on slide member 65 and depresses a push button 71, which in turn depresses pawl 67. Slide member 65 rides in a channel 73 formed within the side of casing 31. Upon firing of the desired lamp 15, the operator pushes slide member 65 downwardly (direction "b" in FIG. 6) whereupon pawl 67 disengages housing 11. The pawl subsequently latches into the lower notch 69 and means 63 is once again ready to advance housing 11. It should be added that slide 65 may be located practically anywhere within casing 31 provided this member is readily accessible to the camera's operator.

The embodiment of FIG. 7 represents an alternative means for effecting sequential movement of housing 11. An elongated slot 75 is provided within casing 31 and includes a stop 77 at an upper end thereof. A thermally-activated switching means 79 is used in conjunction with the aforementioned biasing means 37 (spring 39) shown in FIG. 1. Housing 11 is thus constantly biased toward the assembly's firing location (e.g. station 47 in FIG. 3) but prevented from moving by the switching means 79. In the embodiment of FIG. 7, switching means 79 comprises a hooklike member 81 located on one side of a thin, heat conductive strip 83, located adjacent each lamp. Member 81 is secured to thin strip 83 using a thermally degradable composition 85 which melts upon receipt of heat from lamp 15, said heat passing through an aperture 87 located in housing 11 immediately adjacent the lamp. In a preferred embodiment of the invention, hook 81 is copper, thermally degradable composition 85 is a low melting point alloy (e.g. one having a melting point of about 72 degrees Celsius). Strip 83 is also comprised of copper and has a thickness from about 0.003 to 0.010 inches. A preferred material for composition 85 is Wood's metal. The heat from the flashing of adjacent lamp 15 causes the low temperature alloy 85 to melt and thus release hook 81 to in turn effect release of housing 11. The housing will then move upwardly to locate an unused, fresh lamp in the described firing position. The hook adjacent this fresh lamp will serve as the next stop for housing 11.

Thus there has been shown and described a flash lamp assembly which is compact, relatively inexpensive to produce, and which can be operated in a facile manner. The assembly also substantially eliminates the adverse condition known as "red-eye".

While there have been shown and described what are at present considered the preferred embodiments of the invention, it will be obvious to those skilled in the art that various changes and modifications may be made therein without departing from the scope of the invention as defined by the appended claims.

What is claimed is:

1. A flash lamp assembly comprising:
    a longitudinal, light-transmitting housing defining a plurality of juxtapositioned chambers therein aligned in a substantially linear manner; and
    a plurality of electrically-activated flash lamps each located within a respective one of said chambers and adapted for being electrically activated through said housing, each of said flash lamps having a light-transmitting envelope and first and second spacedly positioned electrically conductive means located externally of said envelope for capacitively igniting said flash lamp through said envelope in response to receipt of electrical energy through said housing.

2. The flash lamp assembly according to claim 1 wherein the number of chambers is eight.

3. The flash lamp assembly according to claim 1 wherein said housing is substantially cylindrical.

4. The flash lamp assembly according to claim 3 wherein said envelope and said housing are coaxially oriented.

5. The flash lamp assembly according to claim 1 further including a plurality of opaque shielding members positioned within a respective one of said chambers for preventing sympathetic ignition between the flash lamp therein and the flash lamp within an adjacent chamber.

6. The flash lamp assembly according to claim 1 further including means for electrically connecting each of said flash lamps to a source of electrical potential typically associated with a camera.

7. The flash lamp assembly according to claim 6 wherein said electrical connecting means comprises an elongated, insulative casing adapted for being mounted on said camera and defining a passage therein adapted for having said light-transmitting housing movably oriented therein, said casing defining a fixed station therein positioned with respect to said passage, said electrical connecting means further including a pair of conductors within said casing for electrically interconnecting each of said electrically conductive means located externally of the envelope of a respective one of said flash lamps with said source of electrical potential when said flash lamp is positioned at said fixed station.

8. The flash lamp assembly according to claim 7 wherein said electrical connecting means further includes means for sequentially advancing said light-transmitting housing within said passage of said casing to permit each of said flash lamps to become stationarily positioned at said fixed station.

9. The flash lamp assembly according to claim 8 further including a reflector mounted on said casing at said fixed station, and reflector reflecting the light from each of said flash lamps as said flash lamps are stationarily positioned at said fixed station and are activated by said source of electrical potential.

10. The flash lamp assembly according to claim 8 wherein said sequentially advancing means comprises a manually-operable slide member movably oriented on said casing and including a pawl member for engaging said light-transmitting housing within said passage of said casing to effect movement of said housing toward said fixed station.

11. The flash lamp assembly according to claim 8 wherein said sequentially advancing means comprises a biasing means located within said passage of said casing for biasing said light-transmitting housing toward said fixed station, and thermally-activated switching means for stationarily retaining said housing within said passage and thereafter releasing said housing to permit movement thereof toward said fixed station in response to receipt of heat from the flash lamp located at said station.

12. The flash lamp assembly according to claim 9 wherein said reflector is of two-part construction with each part electrically insulated from the other and capacitively connected to a respective one of said electrically-conductive means located about said light-transmitting envelope of the flash lamp stationarily positioned at said fixed station, each of said parts of said reflector electrically connected to a respective one of said conductors.

13. The flash lamp assembly according to claim 9 wherein said housing includes a plurality of pairs of openings therein with each of said pairs having access to a respective one of said chambers within said housing, said electrical connecting means further including first and second resilient electrical contacts located at said fixed station and adapted for passing through a respective one of said openings within said housing to electrically engage a respective one of said conductive means located about said light-transmitting envelope of the flash lamp stationarily positioned at said fixed station, each of said electrical contacts electrically connected to a respective one of said conductors.

14. The flash lamp assembly according to claim 10 wherein said slide member movably oriented on said casing further includes a manually-depressable button located therein, said button adapted for engaging said pawl to effect said movement of said light-transmitting housing.

15. The flash lamp assembly according to claim 11 wherein said biasing means comprises a helical spring and said thermally activated switch means comprises a plurality of hooklike members each positioned on said housing adjacent a respective one of said flash lamps and a quantity of thermally-degradable material joining each of said hooklike members to said housing, said hooklike members engaging said casing at said fixed station, said thermally-degradable material becoming degradable and releasing said hooklike member upon receipt of the heat from said flash lamp adjacent thereto.

16. The flash lamp assembly according to claim 15 wherein said housing includes a plurality of apertures therein each located adjacent a respective one of said flash lamps, said thermally activated switch further including a plurality of thin, heat conductive members each located over a respective one of said apertures, each of said hooklike members positioned on one of said thin, heat conductive members using said thermally-degradable material.

* * * * *